Apr. 17, 1923.

J. J. FINNIGAN 1,452,238

METHOD OF MAKING FLANGED TANK COUPLINGS

Filed April 3, 1922

Inventor
J. J. Finnigan.
By C. A. Snow & Co.
Attorney

Patented Apr. 17, 1923.

1,452,238

UNITED STATES PATENT OFFICE.

JOHN JOSEPH FINNIGAN, OF ATLANTA, GEORGIA.

METHOD OF MAKING FLANGED TANK COUPLINGS.

Application filed April 3, 1922. Serial No. 549,095.

*To all whom it may concern:*

Be it known that I, JOHN J. FINNIGAN, a citizen of the United States, residing at Atlanta, in the county of Fulton and State of Georgia, have invented a new and useful Method of Making Flanged Tank Couplings, of which the following is a specification.

This invention relates to flanged tank or boiler couplings, the primary object of the invention being to provide a novel method of applying the flanged couplings.

Another object of the invention is to provide a flanged coupling constructed in a manner to be readily and easily bent to conform to the contour of the tank or boiler, to which the device is secured.

With the foregoing and other objects in view which will appear as the description proceeds, the invention resides in the precise embodiment of the invention hereinafter described and claimed, it being understood that changes in the precise embodiment of the invention herein disclosed, may be made within the scope of what is claimed, without departing from the spirit of the invention.

Referring to the drawing.

Figure 4:
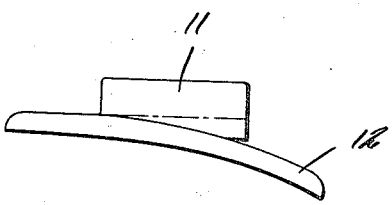
Figure 4 is a coupling bent to conform to a particular curvature, prior to the welding step.
Figure 6:
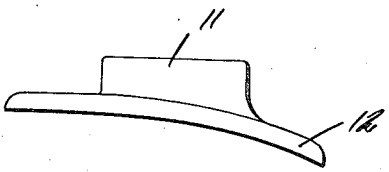

Figure 6 discloses the form of the invention shown by Figure 4 of the drawing as welded.

Figure 1:
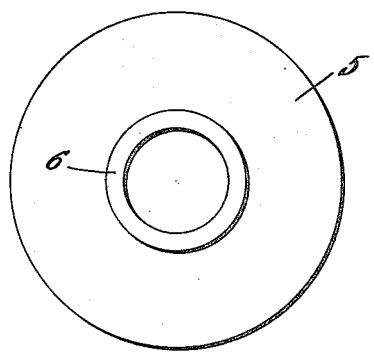
Figure 1 is an elevational view of a flanged coupling before the same has been cut in accordance with my methods.
Figure 2:
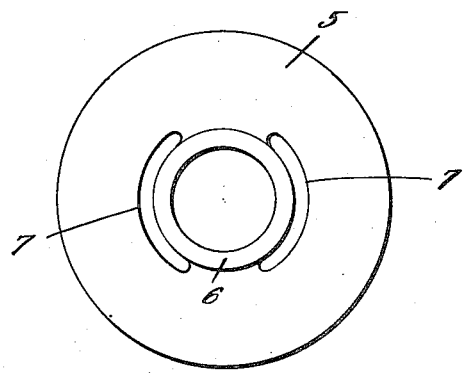
Figure 2 is an elevational view of a coupling showing the same as cut according to one form of my invention.

Referring to the drawings in detail, the coupling is of the usual construction, the same being formed with a flange 5 and a threaded body portion 6, the flange 5 being formed with cut out portions 7 at a point adjacent to the body portion 6 as clearly shown by Figure 2 of the drawing.

Figure 5:
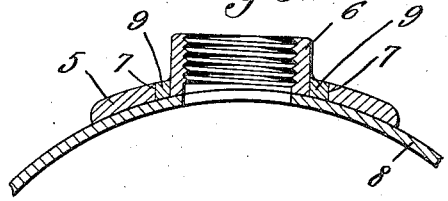
Figure 5 is a sectional view through one of the couplings showing the welding material as filling the cut portion.

It will be obvious that due to these cut out portions 7, the flange 5 may be bent downwardly as clearly shown by Figure 5 of the drawings, to conform to the curvature of the boiler or tank shown at 8, and to which the coupling is secured. When the coupling has been properly positioned, the cut out portions are closed by positioning a suitable material 9 therein, and welding the same in a manner to prevent displacement thereof, and at the same time strengthen the flange.

Figure 3:
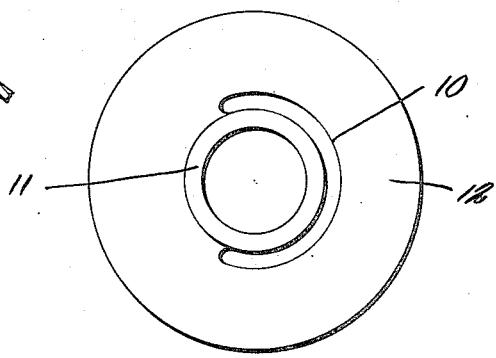
Figure 3 is an elevational view disclosing the coupling as cut in accordance with another form of my invention.

In the form of the invention as shown by Figure 3 of the drawing, it will be seen that a cut out portion 10 is formed adjacent to the body portion 11, the cut out portion extending an appreciable distance around the body portion 11 to permit a portion of the flange 12 to be bent downwardly, as clearly shown by Figure 4 of the drawing, whereupon the cut out portion is filled by welding metal therein as shown by Figure 6 of the drawing.

Having thus described the invention, what is claimed as new is:—

1. A method of preparing flanged couplings for positioning, consisting in cutting away of a portion of the flange, bending the flange and finally filling the cut out portion of the flange with a malleable metal.

2. A method of preparing flanged couplings for positioning, consisting in cutting away portions of the flange, bending the flange to the desired position, and finally positioning material in the cut out portion and welding the same in position.

3. A method of preparing flanged couplings for positioning, consisting in cutting away a portion of the flange adjacent to the central portion thereof, bending the flange, and finally filling the cut out portion with a malleable metal.

4. A method of preparing flanged couplings for positioning, consisting in cutting away portions of the flange, the cut away portions having curved walls, bending the flange, and finally welding a metal in the cut out portions.

In testimony that I claim the foregoing as my own, I have hereto affixed my signature in the presence of two witnesses.

JOHN JOSEPH FINNIGAN.

Witnesses:
    J. F. McGARRY,
    C. F. BREEN.